United States Patent [19]

Brooks et al.

[11] Patent Number: 4,503,508
[45] Date of Patent: Mar. 5, 1985

[54] EXPOSURE CONTROL APPARATUS

[75] Inventors: Edward J. Brooks; Carl N. Schauffele, both of Rochester, N.Y.

[73] Assignee: Eastman Kodak Company, Rochester, N.Y.

[21] Appl. No.: 433,616

[22] Filed: Oct. 12, 1982

[51] Int. Cl.³ .............................................. G03B 7/091
[52] U.S. Cl. ..................................... 364/525; 354/412
[58] Field of Search ................... 364/525; 355/38, 68, 355/77; 354/410, 412, 413

[56] References Cited

U.S. PATENT DOCUMENTS

| 3,646,331 | 2/1972 | Lord | 235/151.3 |
| 4,140,391 | 2/1979 | Laciak et al. | 364/525 X |
| 4,227,808 | 10/1980 | Yuasa | 354/413 X |
| 4,363,541 | 12/1982 | Aihara et al. | 354/412 |
| 4,370,037 | 1/1983 | Uchidoi et al. | 354/412 |
| 4,401,373 | 8/1983 | Nakai | 354/412 |
| 4,412,730 | 11/1983 | Saegusa et al. | 354/410 |
| 4,427,276 | 1/1984 | Feinerman et al. | 354/412 |
| 4,453,811 | 6/1984 | Yamasaki | 354/412 |
| 4,455,068 | 6/1984 | Iszuhara | 354/412 |

OTHER PUBLICATIONS

Research Disclosure, Mar., 1982, item 21504, Automatic Calibration of Microprocessor Clock Frequency, disclosed by E. J. Brooks and C. M. Schauffele.

Primary Examiner—Edward J. Wise
Attorney, Agent, or Firm—Dennis P. Monteith

[57] ABSTRACT

Exposure control apparatus adapted for use with a computer having an inexpensive, uncalibrated clock includes a pair of covariant, internal reference signal sources, an integrator and a comparator that produces a time interval signal when an electrical parameter of the integrator reaches a threshold level established by the comparator. With the covariant reference signal sources connected to the integrator, the computer calculates an initial clock correction factor that is stored in the computer's memory. A standard light source of known intensity, which is used only once, is then coupled to the integrator through a photoresponsive device and the initial clock correction factor is used by the computer to provide compensation for the computer clock during an exposure operation. In the field, the computer, prior to each exposure operation, connects the covariant reference signal sources to the integrator and calculates an updated clock correction factor. When the apparatus is measuring luminance of unknown intensity, for example ambient light, the updated clock correction factor is used by the computer to control a desired exposure parameter.

7 Claims, 4 Drawing Figures 4,503,508

EXPOSURE CONTROL APPARATUS

BACKGROUND OF THE INVENTION

1. Field of the Invention

The present invention relates generally to exposure control apparatus and, more particularly, to computer controlled photographic exposure control apparatus.

2. Description Relative to the Prior Art

One type of computer, a microcomputer, can be used for exposure control in a photographic camera by counting the cycles of its own clock to determine when to enable and/or disable particular camera functions. However, unless the clock frequency is tightly controlled by design, for example by incorporating a crystal controlled oscillator, which is expensive, the clock frequency will have a large initial variability about its nominal value. This variability requires that provisions be made to adjust the clock frequency at some step in the manufacturing process, which is also expensive.

As an alternative to establishing a predetermined clock frequency, it is known in the machine control art to use a computer (1) to measure the actual machine output using a standard reference as the machine input; (2) to calculate a correction factor for the machine that will provide the same response as that of a machine with a desired predetermined output; and (3) to store the correction factor and apply it to the machine outputs obtained using sample materials as inputs. For example, U.S. Pat. No. 3,646,331 discloses a spectrophotometer in which the actual output reflected or transmitted from a standard reference material is digitized. A correction factor is then calculated by a computer such that the digitized output multiplied by the correction factor will provide the ideal theoretical response of the spectrophotometer. The correction factor is stored, sample materials are measured and the spectrophotometer outputs are multiplied in the computer by the correction factor. One disadvantage of this approach is that as the operating conditions of the machine change, for example as the spectrophotometer lamp output changes with age, the ambient temperature changes, or the power supply varies, new correction factors must be calculated using the standard reference material as the machine input. This is not particularly undesirable in the case of a spectrophotometer, but in a photographic camera using a microcomputer for exposure control, a similar approach would require incorporating a stable, standard light source of known intensity in the camera itself. The requirement for a built-in, standardized light source is very costly and prohibits the use of the aforementioned technique in cost competitive photographic applications such as the amateur camera market.

SUMMARY OF THE INVENTION

The present invention provides apparatus for use with a computer having an inexpensive, uncalibrated clock that accurately controls an exposure without requiring the permanent installation of a standard reference source. To provide accurate exposure control a pair of covariant, internal reference signal sources are coupled to an integrator and a comparator to initiate a constant time interval terminated by a time interval signal that is produced by the comparator when the integrator has integrated one of the internal reference signals to a threshold level established by the other reference signal. The actual clock output is measured during this constant time interval and an initial clock correction factor is calculated by the computer, which, when multiplied by the actual clock output, produces a desired predetermined clock output. A standard light source of known intensity, which is used only once, is then measured by the integrator. When the threshold level is reached by the integrator, the time interval signal is produced by the comparator and the initial clock correction factor is used by the computer to provide compensation for the computer clock frequency. The compensated clock frequency is then compared to a known clock frequency corresponding to the standard light source. If the compensated clock frequency does not equal the known clock frequency, it is adjusted through means of neutral density filter or microcomputer program constants to equal the known clock frequency. Because it is used only once, the standard light source advantageously is a part of the assembly equipment and is used to provide initial compensation for many uncalibrated computer clocks.

In the field, the apparatus of the present invention, immediately preceding each camera operation, uses the integrator, comparator and the covariant internal reference signal sources to calculate an updated clock correction factor during the constant time interval. Then, with the camera's photosensor exposed to a scene illuminated by a light source of unknown intensity, for example ambient light, the computer measures the actual clock output required to reach the threshold level, multiplies the actual clock output by the updated correction factor, and makes an exposure decision based on the corrected clock output.

In a preferred embodiment of the invention this is achieved by an exposure control circuit including a voltage comparator having an output coupled to the computer and two inputs. An internal reference voltage source is coupled to one input of the comparator. A timer, which provides a voltage representative of a time interval, is coupled to the other comparator input. The timer includes an internal reference current source which is covariant with the reference voltage source and an integrating device selectively coupled to (1) the internal current reference source, and (2) a photosensitive device alternatively illuminated by a standardized, external light source of known intensity and an external light source of unknown intensity.

The invention and its features and advantages will become more apparent by referring to the accompanying drawings and to the ensuing detailed description of the preferred embodiment.

DETAILED DESCRIPTION OF THE PREFERRED EMBODIMENT

Because photographic exposure control apparatus and digital computers are well known, the present invention will be directed in particular to elements forming part of, or cooperating directly with, the present invention. It is to be understood that exposure control and computer elements not specifically shown or described herein may be selected from those known in the photographic and computer arts.

Figure 1:
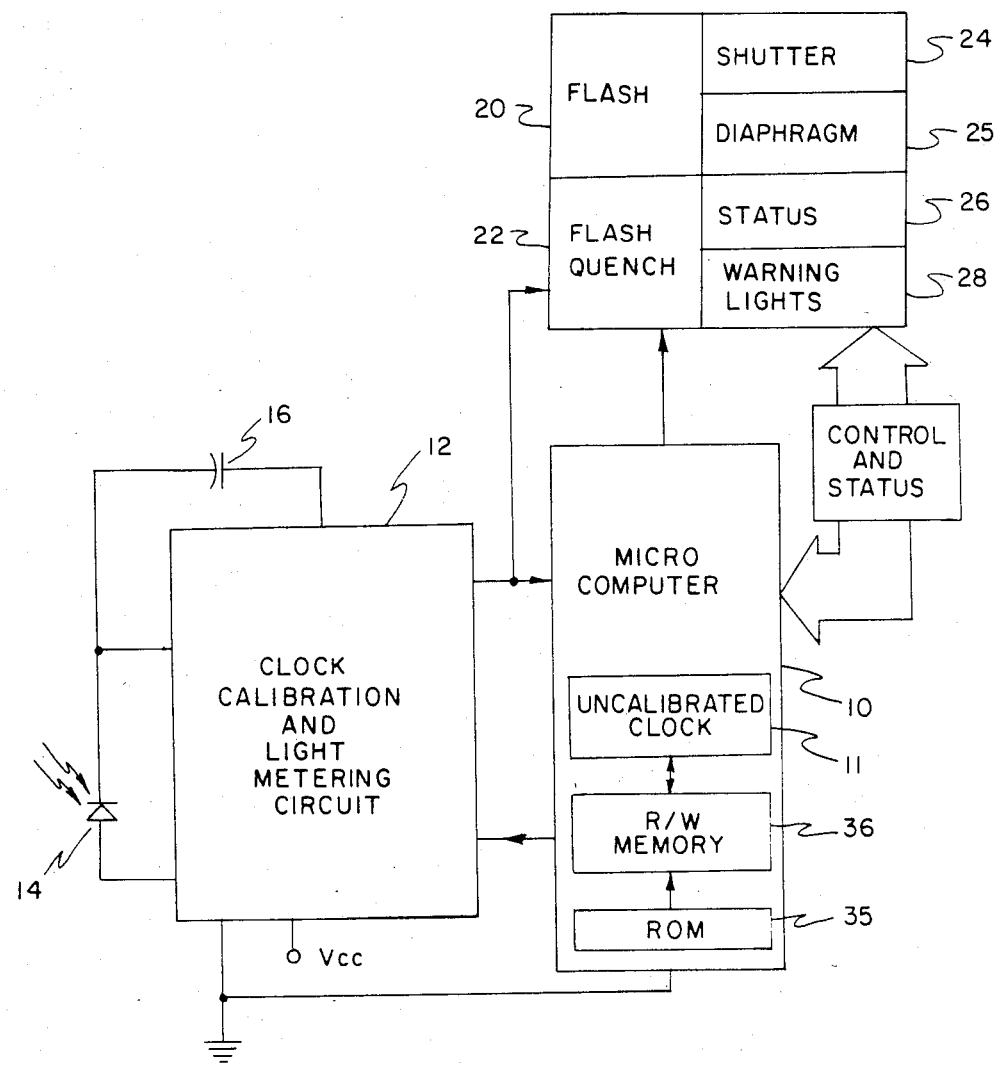
FIG. 1 is a block diagram of a microcomputer controlled, exposure control system according to the present invention.

FIG. 1 of the drawings shows a microcomputer controlled, exposure control system for a photographic camera according to the present invention. It will be understood, however, that the following description of a preferred embodiment of the invention is for illustrative purposes and that the exposure control circuit of the invention can be used with any computer which does not have a precisely controlled clock.

The principal components of the photographic exposure control system shown in FIG. 1 are an off the shelf microcomputer 10 having an inexpensive, uncalibrated clock 11 and a custom, integrated, clock compensation and light metering circuit 12. The integrated clock compensation and light metering circuit 12 receives analog inputs from a photodiode 14 and a capacitor 16 and provides a digital output to the microcomputer 10. The microcomputer uses the output of the circuit 12 to calculate a clock frequency correction factor, initially during manufacture and prior to the taking of each picture, and to control various camera devices during the picture taking cycle. These camera devices may include, for example, a quenchable electronic strobe flash unit 20, a flash quench circuit 22, an electromagnetic shutter 24, a diaphragm 25, a status circuit(s) 26 and one or more operator warning lights 28.

Figure 2:
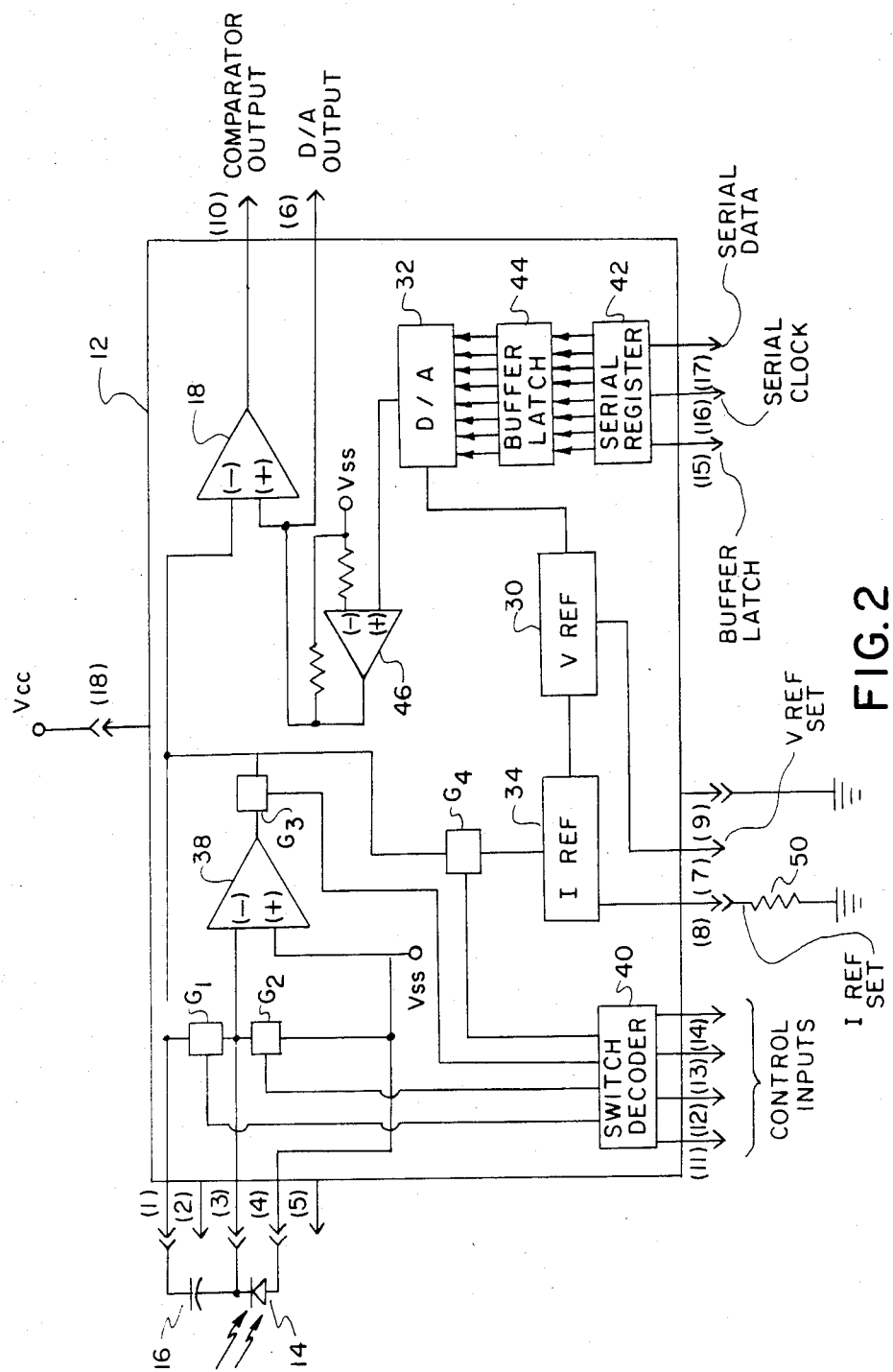
FIG. 2 is a block diagram of the clock compensation and light metering circuit shown in FIG. 1.

To aid the reader's understanding of the present invention, the clock compensation function of the circuit 12 shown in FIG. 2 is first presented. A more detailed explanation of the various components of the circuit 12 then follows.

Initial compensation for the microcomputer's uncalibrated clock 11 is done at the factory during the manufacture of the clock compensation and light metering circuit 12. The initial compensation procedure consists of the following steps.

(1) The microcomputer 10 selects a percentage of a source of reference voltage (hereinaft $V_{REF}$) 30 having a known nominal value to be applied to the positive input of a voltage comparator 18 through a digital to analog converter (hereinafter D/A) 32.

The number of cycles a calibrated clock of known nominal value would require for a source of reference current (hereinafter $I_{REF}$) 34 of known nominal value and covariant with $V_{REF}$ 30 to charge the capacitor 16 of known nominal value to the threshold voltage level applied to the comparator 18 by D/A 32 has been previously programmed by the system designer into the computer Read Only Memory (ROM) 35. The term "covarient" as used herein denotes a relationship between $I_{REF}$ $V_{REF}$ and in which the current output of $I_{REF}$ tracks the voltage output of $V_{REF}$. For example, if $V_{REF}$ increases by 0.5% then $I_{REF}$ must also increase by 0.5%.

(2) The microcomputer 10 counts the actual number of cycles the uncalibrated clock 11 requires for $I_{REF}$ 34 to charge the capacitor 16 to the comparator threshold level. Because $I_{REF}$ 34 is covariant with $V_{REF}$ 30, the time interval required for $I_{REF}$ to charge the capacitor 16 to the comparator threshold level in step (2) is constant despite any variation in the power applied to the circuit 12. That is because if the power applied to the circuit 12 decreases, $V_{REF}$ will decrease and a lower threshold will be applied to the comparator 18; however, $I_{REF}$ will decrease by a covariant amount causing the capacitor 16 to be charged at a slower rate. Conversely, if the applied power increases, $V_{REF}$ will increase and apply a higher threshold level to the comparator 18 but $I_{REF}$ will also covariantly increase causing the capacitor 16 to be charged at a faster rate.

(3) The microcomputer calculates a correction factor for the uncalibrated clock 11. The correction factor is equal to the No. of Calculated Clock Cycles From ROM 35 divided by the Actual Counted No. of Uncalibrated Clock Cycles.

For example, if a calibrated clock would require 50 clock cycles to charge the capacitor 16 to the comparator threshold level and the clock being tested produces only 40 cycles, the correction factor is equal to 50/40 or 1.25.

(4) The correction factor is stored in the computer read/write memory 36.

(5) $I_{REF}$ is disconnected from the negative comparator input and an integrator 38 coupled to the photodiode 14 and the capacitor 16 is substituted in its place. With the photodiode 14 exposed to a standardized light source of known intensity, the microcomputer 10 counts the number of cycles its uncalibrated clock 11 requires for the integrator 38 to charge the capacitor 16 to the threshold level on the comparator 18.

(6) The microcomputer 10 multiplies the number of clock cycles measured in step 5 by the correction factor determined in step 3 (in our example, 1.25) to produce an initial, corrected, number of clock cycles.

(7) The corrected number of clock cycles is stored in memory 36. The corrected number of clock cycles is adjusted to a predetermined number by inserting an appropriate neutral density filter over the photodiode 14.

(8) A camera operation, for example selection of the diaphragm aperture size, is controlled based on the predetermined number of clock cycles determined in step 7.

Once an exposure parameter has been controlled at the factory using (a) the covariant internal voltage and current reference sources, (b) a standardized light source of known intensity and (c) a neutral density filter, the same exposure parameter can be controlled in the field by using the covariant internal voltage and current reference sources, immediately preceding each picture taking operation, to determine an updated clock correction factor. The updated clock correction factor is then used with a light source of unknown intensity, for example available ambient light to produce an updated, corrected number of clocks cycles that is used to control the desired exposure parameter. The updated clock compensation procedure consisting of the following steps.

(9) The microcomputer 10 selects a percentage of $V_{REF}$ 30 to be applied to the positive input of the comparator 18 through the D/A 32.

Again, the number of cycles a calibrated clock of known nominal value would require for $I_{REF}$ 34 to charge the capacitor 16 to the threshold level applied to the comparator 18 by the D/A 32 has been previously programmed into the ROM 35 by the system designer.

(10) The microcomputer 10 counts the actual number of cycles the uncalibrated clock 11 requires for $I_{REF}$ to charge the capacitor 16 to the comparator threshold level. Again, because of the covariancy of $I_{REF}$ to $V_{REF}$, the time interval required for $I_{REF}$ to charge the capacitor 16 to the comparator threshold level remains constant despite any variation in the power applied to the circuit 12.

(11) The microcomputer calculates a correction factor for the uncalibrated clock. For example, if the clock produces 60 cycles during the time interval required to charge the capacitor 16 to the threshold level, this indicates the clock is now running more rapidly for some reason, e.g., temperature change. Accordingly, the computer calculates an updated correction factor of 50/60 or 0.833.

(12) The correction factor is stored in the read/write memory 36.

(13) $I_{REF}$ is disconnected from the negative comparator input and the integrator 38 is substituted in its place. With the photodiode 14 exposed to available ambient light, the microcomputer 10 counts the number of cycles its uncalibrated clock requires for the integrator 38 to charge the capacitor 16 to the threshold level on the comparator 18.

(14) The microcomputer then multiplies the number of clock cycles counted in step 13 by the correction factor determined in step 11 (in our example 0.833).

(15) The updated corrected number of clock cycles determined in step 14 is stored in the memory 36.

(16) A camera operation is controlled based on the updated corrected number of clock cycles.

The use of the same capacitor 16 for both light metering and clock compensation is an important feature of the present invention. Another important feature of the present invention is the manner in which the photodiode 14 and capacitor 16 are used during clock compensation, i.e., initially being coupled to $I_{REF}$ for determining a clock correction factor and subsequently being connected to a light source of known intensity or to a light source of unknown intensity to determine, respectively, an initial corrected clock frequency or an updated corrected clock frequency. This manner of coupling the photodiode 14 and capacitor 16 to the circuit 12 eliminates from the determination of a corrected clock frequency any effects due to variation of the photodiode and/or capacitor themselves.

The clock compensation and light metering circuit 12 shown in FIG. 2 is a dual gain photocurrent integrator and a digitally controlled voltage comparator in an 18 pin package. A serial register 42 receives serial data, under control of a serial clock (not shown) from the microcomputer 10 via pin #17. The register 42 provides parallel data output to a buffer latch 44 which is connected to the D/A 32. The combination of the register 42 and latch 44 increases the speed at which the exposure control can be executed by permitting one byte of data to be resident in the latch 44 while a second byte of data is being received by the register 42.

A buffer amplifier 46 is connected between the D/A converter 32 and the positive input of the voltage comparator 18. The gain provided by the amplifier 46 allows the preferred embodiment of circuit 12 to operate over a broad range of light intensity. If the circuit 12 is not required to operate over a broad range of light intensity, then the amplifier 46 could be eliminated.

Pins #11, 12, 13 and 14 provide control inputs from the microcomputer 10 to a switch decoder 40 which controls the various states of the circuit 12 by controlling the operation of a plurality of gates $G_1$, $G_2$, $G_3$, and $G_4$. The states of the circuit 12 important to the clock compensation function are shown in the following table:

| State No. | C0 | C1 | C2 | C3 | Gate $G_1$ | Gate $G_2$ | Gate $G_3$ | Gate $G_4$ | Function |
|---|---|---|---|---|---|---|---|---|---|
| 1 | 0 | 0 | 0 | 0 | ON | OFF | ON | OFF | C RESET |
| 2 | 0 | 0 | 0 | 1 | OFF | ON | OFF | ON | CURRENT REF |
| 3 | 0 | 0 | 1 | 0 | OFF | OFF | ON | OFF | C, P.D. INTEGRATING |

When power is first supplied to the circuit 12 through pin #18, the integrator 38 is reset by rendering the gates $G_2$ and $G_4$ non-conductive and gates $G_1$ and $G_3$ conductive (state 1). This forces the voltage on the capacitor 16 to start from zero volts. At the start of the initial and updated clock compensation procedures, gates $G_2$ and $G_4$ are rendered conductive and the gates $G_1$ and $G_3$ non-conductive (state 2). When $I_{REF}$ has charged the capacitor 16 to the threshold level on the comparator 18, the integrator 38 is again reset (state 1). The initial and updated clock compensation procedures are then completed, using a standardized light source and an unknown light source, respectively, as input to the photodiode 14, by rendering gates 1, 2 and 4 non-conductive and the gate 3 conductive.

Figure 3:
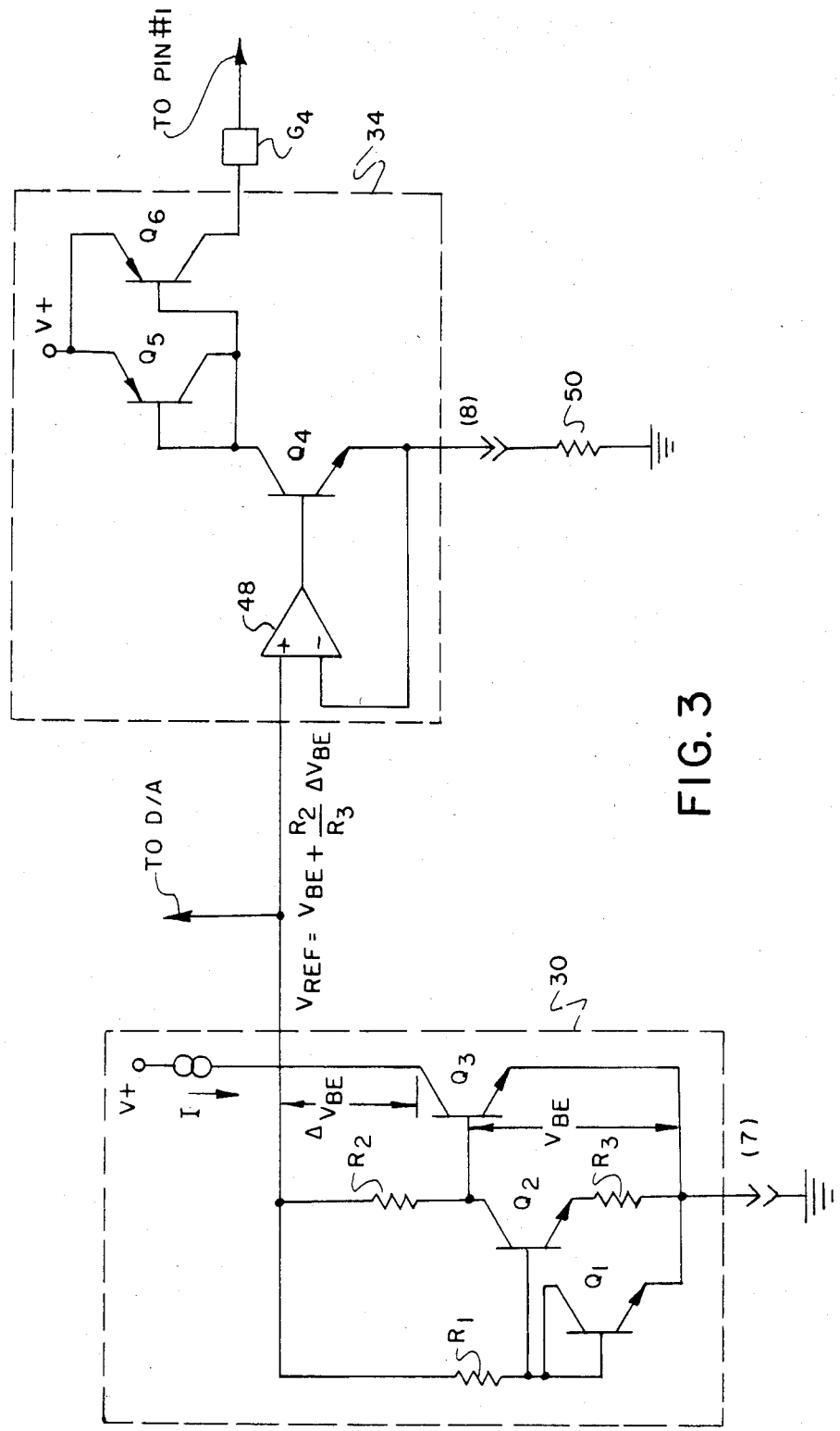
FIG. 3 is a schematic circuit diagram illustrating the manner of coupling the voltage reference source and the current reference source shown in FIG. 2 to achieve co-variance.

FIG. 3 shows an arrangement for coupling the current reference source 34 to the voltage reference source 30 to achieve covariancy. The voltage reference source 30 which preferably is a band gap voltage regulator, provides a reference voltage at the collector of transistor $Q_3$. As shown in the drawing, this reference voltage is derived according to the equation:

$$V_{REF} = V_{BE} + R_2/R_3 \Delta V_{BE}$$

The reference voltage $V_{REF}$ supplied by the collector of transistor $Q_3$ is applied to the positive input of an amplifier 48 of the current reference source 34. The amplifier 48 together with a transistor $Q_4$ form a constant current generator, the output of which is coupled to a current mirror consisting of transistors $Q_5$ and $Q_6$. One branch of the current mirror is connected to an external low temperature coefficient resistor 50 through the transistor $Q_4$ and pin #8. The other branch of the current mirror is connected to the capacitor 16 through pin #1.

Figure 4:
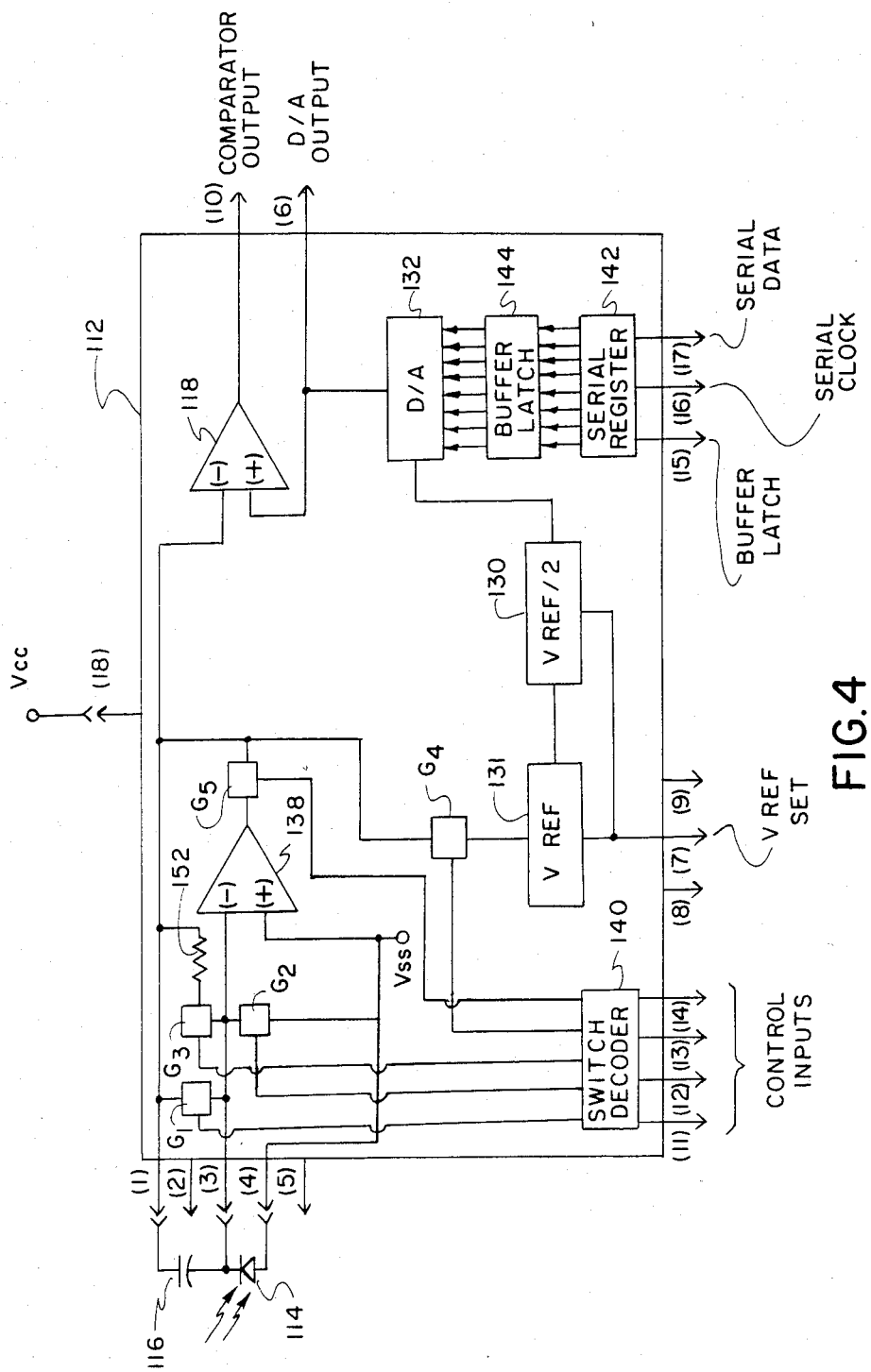
FIG. 4 is a block diagram of an alternative embodiment of a clock compensation and light metering circuit.

FIG. 4 shows an alternative embodiment of a clock compensation and light metering circuit 112. The initial clock compensation procedure for the circuit 112 consists of the following steps.

(1) The microcomputer selects a percentage of a first source of reference voltage $V_{REF/2}$ (130) to be applied to the positive input a digitally controlled voltage comparator 118 through a digital to analog converter (D/A) 132.

(2) The gates $G_1$, $G_3$ and $G_5$ are rendered non-conductive and the gates $G_2$ and $G_4$ conductive and a capacitor 116 is charged to the voltage potential of a second source of reference voltage $V_{REF}$ (131) which is covariant with the voltage reference source $V_{REF/2}$ (130).

(3) The gate $G_3$ is rendered conductive, the gate $G_4$ non-conductive and a timing loop in the microcomputer is started to count the actual number of cycles for the microcomputer's uncalibrated clock requires for the capacitor 116 to discharge through a low temperature coefficient resistor 152 to the comparator threshold level provided by $V_{REF/2}$ and the D/A 132.

(4) The microcomputer calculates a correction factor for the uncalibrated clock by dividing the calculated number of clock cycles stored in the microcomputer's ROM by the actual counted number of uncalibrated clock cycles.

(5) The correction factor is stored in the computer's read/write memory.

(6) $V_{REF(131)}$ is disconnected from the negative comparator input. With the photodiode 14 exposed to a standardized light source of known intensity, the microcomputer counts the number of cycles its uncalibrated clock requires for the photodiode 14 to charge the capacitor 16 to the threshold level on the comparator 118.

(7) The microcomputer multiplies the number of clock cycles in step 6 by the correction factor determined in step 4.

(8) The corrected number of clock cycles determined in step 7 is stored in the read/write memory.

(9) A camera operation is controlled based on the corrected number of clock cycles.

Updated clock correction factors are subsequently determined in the field prior to each picture taking operation following the same procedure set forth above except that in step 6 the photodiode 14 is exposed to ambient light of unknown intensity.

The invention has been described in detail with reference to a preferred embodiment thereof, but it will be understood that variations and modifications can be effected within the spirit and scope of the invention. For example, in the preferred embodiment of the invention, the clock compensation and light metering circuit 12 includes a second capacitor and a second photodiode responsive to flash light coupled to the circuit 12 through pins #2 and #5, respectively. Clock compensation, however, both initial and updated, are performed using only the photodiode 14 and capacitor 16 which are responsive to ambient light.

While the custom clock compensation and light metering circuit has been shown as implemented with bipolar, integrated circuit technology, the circuit can also be implemented with MOS integrated circuit technology.

If desired the microcomputer itself, rather than the systems designer, could calculate the number of clock cycles a calibrated clock would require for the source of reference current 34 to charge the capacitor 16 to the threshold level applied to the comparator 18 by the D/A 32 and store the calculated number in the read/write memory 36. This alternative, however, increases the read/write memory's requirements and increases the complexity of the microcomputer's program.

I claim:

1. Exposure control apparatus adapted for initial compensation by reference to luminance of known intensity and for exposure control use by reference to luminance of unknown intensity comprising:

integrator means selectively coupled to the luminance of known intensity and the luminance of unknown intensity;

comparator means for producing a time interval signal when an electrical parameter of said integrator means reaches a threshold level established by the comparator means, first reference signal generating means for generating a primary reference signal;

second reference signal generating means connected to the first reference signal generating means and producing a secondary reference signal that is covariant with the primary reference signal; and control means for initiating the primary and secondary reference signals;

one of the reference signal generating means being connected to the comparator means to control the threshold level in accordance with the output signal of that reference signal generating means and the other of the reference signal generating means being connected to the integrator means so that the signal from that reference signal generating means is integrated by the integrator means, said exposure control apparatus having an initial mode of operation in which an exposure parameter is controlled with the luminance of known intensity coupled to the integrator means and a field mode of operation in which the same exposure parameter is controlled with the luminance of unknown intensity coupled to the integrator means.

2. The exposure control apparatus according to claim 1 wherein said integrating means comprises a photodiode and a capacitor of predetermined nominal value.

3. The exposure control apparatus according to claim 1 wherein said first reference signal generating means comprises a band gap voltage regulator and said second reference signal generating means comprises a low temperature coefficient resistor, a constant current generator and a current mirror.

4. The exposure control apparatus according to claim 1 wherein said first reference signal generating means comprises a first band gap voltage regulator and said second reference signal generating means comprises a second band gap voltage regulator which is selectively coupled to the parallel combination of a low temperature coefficient resistor and a capacitor.

5. The exposure control apparatus according to claim 1 wherein said control means initiates said field mode of operation prior to each exposure.

6. An exposure control circuit adapted for use with luminance of known intensity, luminance of unknown intensity and a computer operative under a stored program, the computer having an uncalibrated clock and a read/write memory, said exposure control circuit comprising:

(a) a comparator having an output coupled to the computer and two inputs;

(b) a first reference signal source, said first reference signal source having an output providing at least first and second threshold signals to a first input of said comparator; and (c) timer means having an output coupled to a second input of said comparator, the output of said timer means being a signal representative of a time interval, said timer means including (1) a second reference signal source connected to said first reference signal source so that a change in the output signal provided by said first reference signal source is accompanied by a covariant change in the output signal supplied by said second reference signal source and (2) an integrating means selectively coupled to said second reference signal source, the luminance of known intensity and the luminance of unknown intensity;

said exposure control circuit having an initial mode of operation in which (1) with the integrating means coupled to said second reference signal source the comparator counts the number of cycles the uncalibrated microcomputer clock requires for said timer means to provide a signal to the comparator equal to said first threshold signal provided to the comparator by said first reference signal source, (2) the computer calculates a first correction factor, (3) the first correction factor is stored in memory, (4) with the luminance of known intensity coupled to said integrating means the comparator counts the number of uncalibrated clock cycles required for said timer means to provide a signal to said comparator equal to said second threshold signal provided said comparator by said first reference signal source, (5) the computer multiplies the number of clock cycles determined in step 4 by the first correction factor stored in memory in step 3, (6) the initial corrected number of clock cycles determined in step 5 is stored in memory, and (7) an exposure parameter is controlled based on this initial corrected number of clock cycles;

and a field mode of operation in which (8) with the integrating means coupled to said second reference signal source the comparator counts the number of cycles the uncalibrated microcomputer clock requires for said timer means to provide a signal to the comparator equal to said first threshold signal provided to the comparator by said first reference signal source, (9) the computer calculates a second correction factor, (10) the second correction factor is stored in memory, (11) with the luminance of unknown intensity coupled to said integrating means said comparator counts the number of uncalibrated clock cycles required for said timer means to provide a signal to said comparator equal to said second threshold signal provided to said comparator by said first internal reference signal source, (12) the computer multiplies the number of clock cycles determined in step 9 by the second correction factor stored in memory in step 8, (13) the updated corrected number of clock cycles determined in step 10 is stored in memory, and (14) the same exposure parameter is controlled based on the updated corrected number of clock cycles.

7. The exposure control circuit according to claim 6 wherein the computer initiates said field mode of operation immediately preceding each exposure.

* * * * *